United States Patent [19]

Good et al.

[11] Patent Number: 5,422,778
[45] Date of Patent: Jun. 6, 1995

[54] PROTECTION SYSTEM FOR CONTROLLER AND CONTROL WIRING INDUCED UNDER VOLTAGE FAULTS IN AN ELECTRIC POWER GENERATING SYSTEM

[75] Inventors: Jef W. Good, Beloit, Wis.; David J. Mrowiec, Rockford, Ill.

[73] Assignee: Sundstrand Corporation, Rockford, Ill.

[21] Appl. No.: 98,691

[22] Filed: Jul. 28, 1993

[51] Int. Cl.$^6$ .............................................. H02H 7/06
[52] U.S. Cl. .................................. 361/92; 361/20; 361/21; 361/86
[58] Field of Search ............... 361/92, 90, 20, 21, 361/23, 33, 51, 52, 86

[56] References Cited

U.S. PATENT DOCUMENTS 4,595,965  6/1986  Glennon .............................. 361/20

Primary Examiner—Brian K. Young
Assistant Examiner—Sally C. Medley
Attorney, Agent, or Firm—Jeffery J. Makeever

[57] ABSTRACT

A protection system minimizing utilization equipment's exposure to, and power interruption resulting from, an under voltage condition in an electric power generating system includes generator current sensors, generator speed information, an exciter current sensor, voltage sensors, and a controller. The controller utilizes a voltage level detector which calculates an average voltage magnitude and generates a control signal when the average voltage magnitude drops below a threshold, and which monitors the peak value of each phase voltage and generates a lock out signal when any one of the phase voltages exceeds a threshold; a current detector which generates an enable signal when the magnitude of the highest phase of the generator current is less than a threshold; an exciter current detector which generates a second enable signal when the exciter current is outside an acceptable operating range; a generator speed monitor which generates a control signal when the generator speed is above a minimum regulation speed; protection logic which generates a protective trip signal; and breaker drivers which control the position of system breakers to isolate the fault and re-energize the system loads. The protection logic discriminates between an under voltage condition caused by an overload or a through fault on a main load bus, and one caused by a failure in the controller or associated wiring.

6 Claims, 3 Drawing Sheets

PROTECTION SYSTEM FOR CONTROLLER AND CONTROL WIRING INDUCED UNDER VOLTAGE FAULTS IN AN ELECTRIC POWER GENERATING SYSTEM

FIELD OF THE INVENTION

The present invention relates generally to protection systems for electric power generating systems, and more particularly to a system of protection which discriminates between controller and control wiring induced under voltage faults, and those induced by an overload or a through fault on a main load bus.

BACKGROUND ART

FIG. 1 illustrates a prior art electric power generating system (EPGS) 7 of the type manufactured by the assignee of the present invention for use in airframes. The EPGS 7 is comprised of a plurality of generating channels 37. Each channel comprises a generator unit such as an integrated drive generator 9 coupled to an input shaft (not illustrated) from an airframe propulsion engine. The output of the IDG 9 is connectable by a generator control breaker (GCB) 31 to a load distribution bus 23 which is connectable by a bus tie breaker (BTB) 29 to a tie bus 35. Position control for each breaker is transmitted via control line 33 to the GCB 31, and via control line 27 to the BTB 29. Each IDG 9 is conventional and is comprised of a constant speed transmission and a permanent magnet generator which generates alternating current which is rectified and applied, through a series connected generator control relay (GCR) (not illustrated), to a wound field exciter on line 19 which produces alternating current which is rectified and applied to the rotor of a three phase alternator. The number of IDGs 9 included in the EPGS 7 varies directly with the number of engines on the airframe and typically is between 2 and 4. The rotor of the three phase alternator is driven by the constant speed transmission (included within the IDG 9) which converts a variable speed shaft from the airframe propulsion engine into a constant speed drive which rotates the rotor of the three phase alternator at a velocity for producing three phase 400 Hz electrical power. Each IDG 9 has an associated generator control unit (GCU) 11 which may contain a programmed microprocessor or other means for implementing various conventional control and protection functions as well as functions which are described below which are pan of the present invention.

In addition to the main engine driven IDGs 9, an auxiliary power unit driven generator unit (AGEN) 13 is often included as an integral pan of the EPGS 7. The AGEN 13 is connectable by an auxiliary power breaker (APB) 39 to the tie bus 35 to allow the AGEN 13 to power the main channel load busses 23 via the BTBs 29 during IDG fault or loss of engine conditions, or while on the ground without main engines running. As with the IDGs 9, the AGEN 13 has an associated generator control unit (AGCU) 15 which also may contain a programmed microprocessor or other means for implementing various conventional control and protection functions. Often, the GCU 11 and the AGCU 15 are identical units, differing only in the control algorithms executed by the microprocessor. Also included is a connection 17 to allow external power (EXT PWR) to be connected to the tie bus 35 to supply the main channel's load distribution busses 23 through the BTBs 29 while on the ground.

To protect the utilization equipment from a low voltage operating condition, the GCU 11 utilizes generator speed information, and voltage sense line 41 to monitor system voltage at the point of regulation (POR) 43. The GCU 11 processes the information collected by these sensors via a voltage level detector 47 (see FIG. 2), which calculates an average voltage magnitude and generates an under voltage control signal when the average voltage magnitude drops below a threshold, and via a generator speed monitoring means 49 which generates a ready speed control signal when the generator speed is above a minimum regulation speed.

The under voltage protection logic 45 as shown in FIG. 2 monitors these control signals and the position status of the GCR (not illustrated) via a GCR monitor 51 to determine if an under voltage fault condition exists. Specifically, logic gate 53 generates an under voltage protection signal on line 55 when a logic "1" is produced by the GCR monitor 51 on line 57 indicating that the GCR is closed allowing excitation power to be connected to the wound exciter field of the IDG (not shown), and a logic "1" is produced by the speed monitoring means 49 on line 59 indicating that the IDG is being driven above its minimum regulation speed, and a logic "1" is produced by the voltage level detector 47 on line 61 indicating that the average voltage on the POR 43 (FIG. 1) is less than a predetermined threshold (this threshold is set to 104.5±1.5 volts for a 115 volt aircraft EPGS). Once the under voltage protection signal on line 55 is generated, time delay 63 begins to operate. The duration of the time delay 63 is predetermined to coordinate with the trip characteristics of aircraft distribution protective devices (not shown), and is typically set to 9.75 seconds. A time delay duration of 9.75 seconds allows faults downstream of the distribution protection devices which overload the IDG and result in an under voltage condition to be cleared by these devices prior to generating an output protection signal on line 65.

If the undervoltage fault persists beyond the time by which the distribution protective device should have tripped to clear the fault, indicating a non-distribution type fault, the time delay 63 expires and the output under voltage protection signal on line 65 is generated. In response to this protection signal, the GCU 11 (see FIG. 1) trips the GCR (not shown) and GCB 31 which de-energizes the IDG 9 and disconnects it from the load distribution bus 23. The GCU 11 then may close the BTB 29 to allow an alternate source to re-power the loads via the tie bus 35.

One problem associated with this protection system is that for many non-distribution type faults resulting in an under voltage condition, such as failures within the IDG 9 or the GCU 11 or on the exciter drive line 19 itself, the utilization equipment is subjected to a low voltage for the duration of the time delay 63 (see FIG. 2) which is set to coordinate with distribution protection devices which would never operate to clear these types of faults. If, for example, the exciter drive line 19 were to break open, disconnecting the excitation power from the wound exciter (not shown), the output voltage would drop to zero for 9.75 seconds. All of the utilization equipment connected to the affected load distribution bus 23 would be lost during this period until the GCU 11 operates to disconnect the de-energized IDG 9 from, and connect the tie bus 35 to, the load distribution bus 23. If this fault were to occur during a critical phase of the flight, such as on take-off or landing, the loss of essential flight instruments and controls for this long period of time could result in serious consequences.

Another problem associated with this protection system for under voltage faults resulting from a controller or control wiring failure is that much of the utilization equipment utilize volatile memory for much of their data storage, the contents of which are lost as a result of a 9.75 seconds loss of power. This loss of data can be prevented by increasing the size of storage elements in the utilization equipment's power supplies or other techniques such as the use of non-volatile memory. Both of these solutions, however, increase the cost and the complexity of each piece of utilization equipment.

The present invention is directed to overcoming one or more of the above problems by discriminating the cause of the under voltage condition between that which is the result of an overload or a through fault on a main load bus, requiring coordination with aircraft distribution protective devices and thus a long time delay, and that which is the result of a controller or control wiring failure, requiring no coordination with the aircraft distribution protective devices and thus a very short time delay.

SUMMARY OF THE INVENTION

It is the principle objective of the instant invention to provide a new and improved system of protection for an aircraft electric power generating system. More specifically, it is the objective to provide a system of protection which will minimize the utilization equipment's exposure to, and power interruption resulting from, an under voltage condition by discriminating between an under voltage condition caused by an overload or a through fault on a main load bus, and one caused by a failure in the controller or associated wiring.

In an exemplary embodiment of the instant invention, the protection system comprises current sensors which sense the electrical current generated by its channel's generator and which produce output generator current sense signals proportional to the magnitude of the generator current sensed, a signal from which generator-/IDG input speed can be determined, an exciter drive current sensor which produces an output exciter drive current sense signal proportional to the magnitude of the exciter drive current sensed, and a voltage sensor which monitors the alternating current voltage at the generator's point of regulation and which produces voltage sense signals proportional to the voltage sensed. The exemplary embodiment of the protection system further comprises a controller which is responsive to the output generator current sense signals, the speed sense signal, the voltage sense signals, and the output exciter drive current sense signal. These signals are used to discriminate between an under voltage condition caused by an overload or a through fault on a main load distribution bus and one caused by a failure within the controller or associated wiring. Once a fault has been detected and its cause discriminated, the controller generates a trip drive signal for both the generator control breaker and generator control relay, disconnecting and de-exciting the generator from the load distribution bus and isolating the under voltage fault.

BRIEF DESCRIPTION OF THE DRAWINGS

Reference is now made to the Description of the Preferred Embodiments, taken in conjunction with the accompanying illustrations, in which.

DESCRIPTION OF THE PREFERRED EMBODIMENTS

Figure 3:
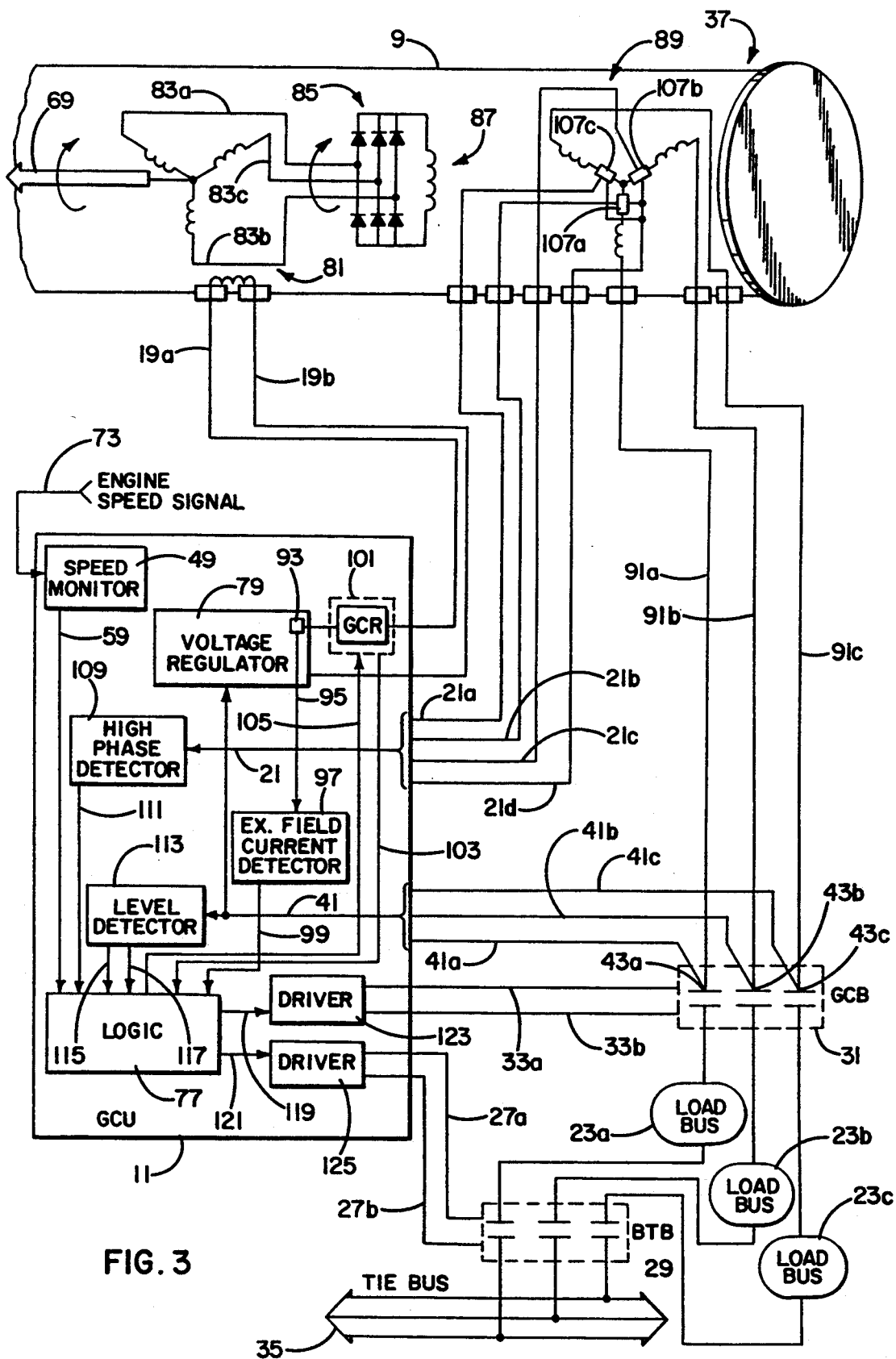
FIG. 3 illustrates a block interconnect diagram of the protection system of the instant invention.

FIG. 3 depicts a block diagram representation of an embodiment of the protection system in accordance with the instant invention. Like reference numerals identify like parts in FIGS. 1, 2, 3 and 4. A controller, hereinafter generator control unit (GCU) 11, communicates with the components of a single channel 37 of an aircraft electrical power generating system (EPGS), including a first generator unit, hereinafter integrated drive generator (IDG) 9, switchably coupled through a first breaker, hereinafter generator control breaker (GCB) 31, to a load distribution bus 23a, 23b, 23c which is switchably coupled through a second breaker, hereinafter bus tie breaker (BTB) 29, to a tie bus 35. Means for sensing an aircraft engine speed sense signal 73 communicates with speed monitoring means 49. The output of the speed monitoring means 49 is transmitted via line 59 to the GCU's logic means 77 for processing.

A voltage regulator 79 provides exciter drive current through a series connected generator control relay (GCR) 101 via lines 19a, 19b to a wound exciter 81. This wound exciter 81 produces alternating current on lines 83a, 83b, 83c which is rectified by diode bridge 85 and applied to the rotor 87 of a three phase alternator 89. The resultant output alternating current voltage is transmitted via power feeders 91a, 91b, 91c through the GCB 31 to the load distribution bus 23a, 23b, 23c. The voltage regulator 79 adjusts the exciter drive current to maintain a constant voltage level at a point of regulation (POR) 43a, 43b, 43c as sensed by voltage sensing means, such as voltage sense lines 41a, 41b, 41c. The magnitude of exciter drive current provided to the exciter 81 is monitored by exciter sensing means 93 which provides a proportional sense signal via line 95 to exciter field current detection means 97. The output of the exciter current detection means 97 is transmitted via line 99 to the GCU's logic means 77 for processing. The position status of the GCR 101 is also transmitted to the logic means 77 via line 103. Control of position for the GCR 101 is from the logic means 77 via line 105.

The output current of the IDG 9 carried via power feeders 91a, 91b, 91c through the GCB 31 to the load bus 23a, 23b, 23c is sensed by current sensing means, such as current transformers (CTs) 107a, 107b, 107c in FIG. 3. The proportional sense signals from each CT 107a, 107b, 107c is transmitted to the GCU's high phase detection means 109 via lines 21a, 21b, 21c and a common return line 21d. The output of the high phase detection means 109 is transmitted to the logic means 77 via line 111 for processing. The output voltage of the IDG 9 as sensed at the POR 43a, 43b, 43c via sense lines 41a, 41b, 41c, in addition to being used by the voltage regulator 79, is transmitted to voltage level detection means 113. The voltage level detection means 113 monitors these signals and produces two outputs on lines 115 and 117 for use by the logic means 77 in discriminating the presence and cause of an under voltage fault.

Once the logic means 77 has discriminated the presence and cause of an under voltage fault, a position control signal is transmitted via line 119 to breaker drive means 123 which controls the position of GCB 31 via lines 33a, 33b. The logic means 77 also transmits a position control signal to the GCR 101 via line 105 to disconnect the voltage regulator 79 from the wound exciter 81. Once the fault has been isolated, a position control signal is transmitted via line 121 to breaker drive means 125 which controls the position of the BTB 29 via lines 27a, 27b.

In the preferred embodiment of the instant invention as illustrated in FIG. 3, the protection system for use in an electric power generating system minimizes system exposure to, and power interruption resulting from, an under voltage condition. This protection system comprises multiple sensors which monitor various system operating parameters for use in discriminating the Under voltage fault. Current transformers (CTs) 107a, 107b, 107c monitor generator loading by sensing the electrical current generated by the IDG 9 and producing output generator current sense signals which are proportional to the magnitude of the actual generator current sensed. Means for sensing an aircraft engine speed signal on line 73 are provided which produce a generator speed sense signal. Means 93 are also provided for sensing generator exciter drive current. This exciter sensing means 93 produces an output exciter drive current sense signal proportional to the magnitude of the actual exciter drive current provided to the IDG 9. Additionally, lines 41a, 41b, 41c are provided to sense the alternating current voltage at the point of regulation 43a, 43b, 43c generated by the IDG 9, and to produce voltage sense signals proportional to the magnitude of the alternating current voltage sensed. Further, the protection system utilizes a GCU 11, which is responsive to the output generator current sense signals, the speed sense signal, the voltage sense signals, and the output exciter drive current sense signal, to discriminate between an under voltage condition caused by an overload or a through fault on a main load distribution bus 23a, 23b, 23c, and an under voltage condition caused by a failure within the GCU 11 or associated wiring 19a, 19b, 41a, 41b, 41c. In response to the discrimination of the under voltage fault, the GCU 11 generates a first trip drive signal on line 33a to trip the GCB 31 and isolate the fault.

In a further embodiment of the under voltage protection system, the GCU 11 comprises voltage level detection means 113, responsive to the voltage sense signals on lines 41a, 41b, 41c, which monitor the peak voltage magnitude and calculate an average voltage magnitude. The voltage level detection means 113 generate an under voltage II lockout signal on line 115 when the peak voltage magnitude of any phase exceeds a predetermined threshold. The voltage level detection means 113 also generates an under voltage control signal on line 117 when the average voltage magnitude as sensed on the POR 43a, 43b, 43c drops below a predetermined threshold. In addition to the voltage level detection means 113, the GCU 11 comprises high phase detection means 109 which generate an under voltage enable control signal on line 111 when the magnitude of the highest of the output generator current sense signals on lines 21a, 21b, 21c is less than a predetermined threshold. Exciter field current detection means 97 are also provided which generate an under voltage II enable signal on line 99 when the output exciter drive current sense signal is outside a predetermined acceptable operating range. Additionally, generator input speed monitoring means 49 are provided which generate a ready-speed control signal when the generator input speed sense signal indicates that the generator speed is above a predetermined minimum regulation speed.

The GCU 11 further comprises logic means 77 which generate a protective trip signal in response to the under voltage control signal, the under voltage enable control signal, the under voltage II enable signal, the under voltage II lockout signal and the ready-speed control signal inputs. The breaker drive means 123 issues the first trip drive signal on line 33a in response to this protective trip signal to trip the GCB 31 and isolate the under voltage fault.

Figure 4:
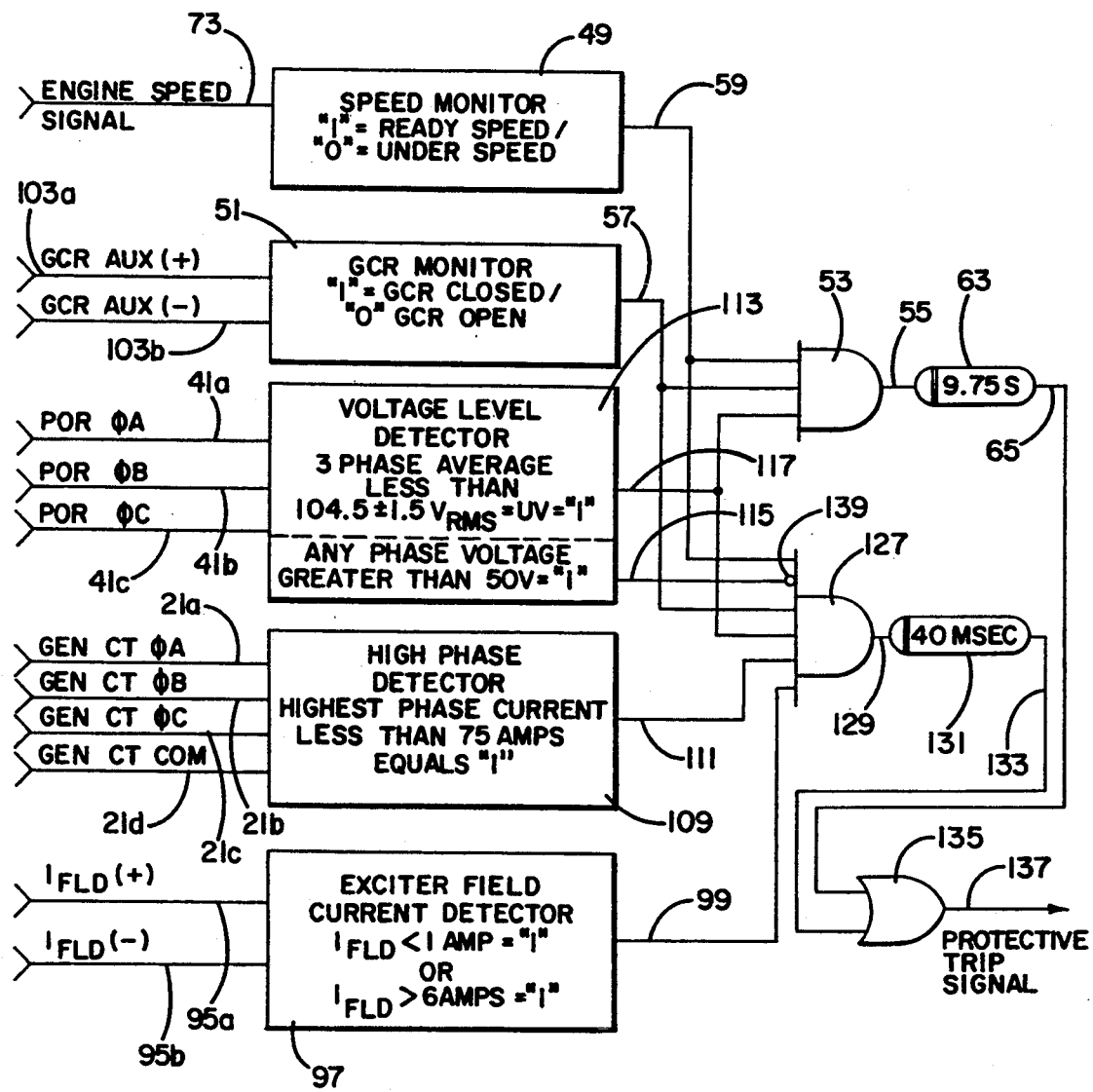
FIG. 4 illustrates a functional block logic diagram of the under voltage protection system of the instant invention.

FIG. 4 depicts a functional block logic diagram of a further embodiment of the under voltage protection system in accordance with the instant invention. The speed monitor means 49 receives the aircraft engine speed sense signal via line 73, and transmits its output via line 59 to a first AND gate 53, having a first, second and third inputs and an output, and a second AND gate 127, having a first, second, third, fourth, fifth and sixth inputs and an output. The GCR monitor 51 receives the GCR position status information via lines 103a and 103b, and transmits its output via line 57 to the first AND gate 53 and to the second AND gate 127. Voltage level detection means 113 receives the voltage sense signals via lines 41a, 41b, 41c, and generates two outputs. The first of which is transmitted via line 117 to the first AND gate 53 and to the second AND gate 127, while the second of which is transmitted to an inverting input 139 of the second AND gate only. The high phase detection means 109 receives the current sense signals via lines 21a, 21b, 21c, 21d, and transmits its output via line 111 to the second AND gate 127. The exciter field current detection means 97 receives the exciter drive current sense signal via lines 95a, 95b, and transmits its output via line 99 to the second AND gate 127. The output of the first AND gate 53 is transmitted via line 55 to a first time delay 63. The output of the first time delay 63 is transmitted via line 65 to an OR gate 135 having a first and a second input and an output. The output of the second AND gate 127 is transmitted via line 129 to a second time delay 131. The output of the second time delay 131 is transmitted via line 133 to the OR gate 135. The output of the OR gate 135 is transmitted via line 137 for use by the GCU 11.

The speed monitoring means 49 deduces the IDG input speed and compares that speed to a predetermined threshold. If the IDG input speed is above the minimum idle speed of the engine, the output on line 59 is set to a logic level "1" indicating that the generator (not shown) is operating above its minimum regulation speed. A logic level "0" on line 59 indicates that the generator is not operating above its minimum regulation speed, and that any under voltage sensed is not the result of a failure which may be isolated by the protection system of the present invention. The GCR monitor means 51 produces a logic level "1" on line 57 if the GCR 101 (FIG. 3) is in the closed position indicating that the voltage regulator 79 (FIG. 3) is connected to the wound exciter 81 (FIG. 3). A logic level "0" on line 57 indicates that the GCR 101 (FIG. 3) is open and that the voltage regulator 79 (FIG. 3) is isolated from the wound exciter 81 (FIG. 3). This condition results in a controlled deenergization of the generator and is not the result of a failure which may be isolated by the protection system of the present invention.

Figure 1:
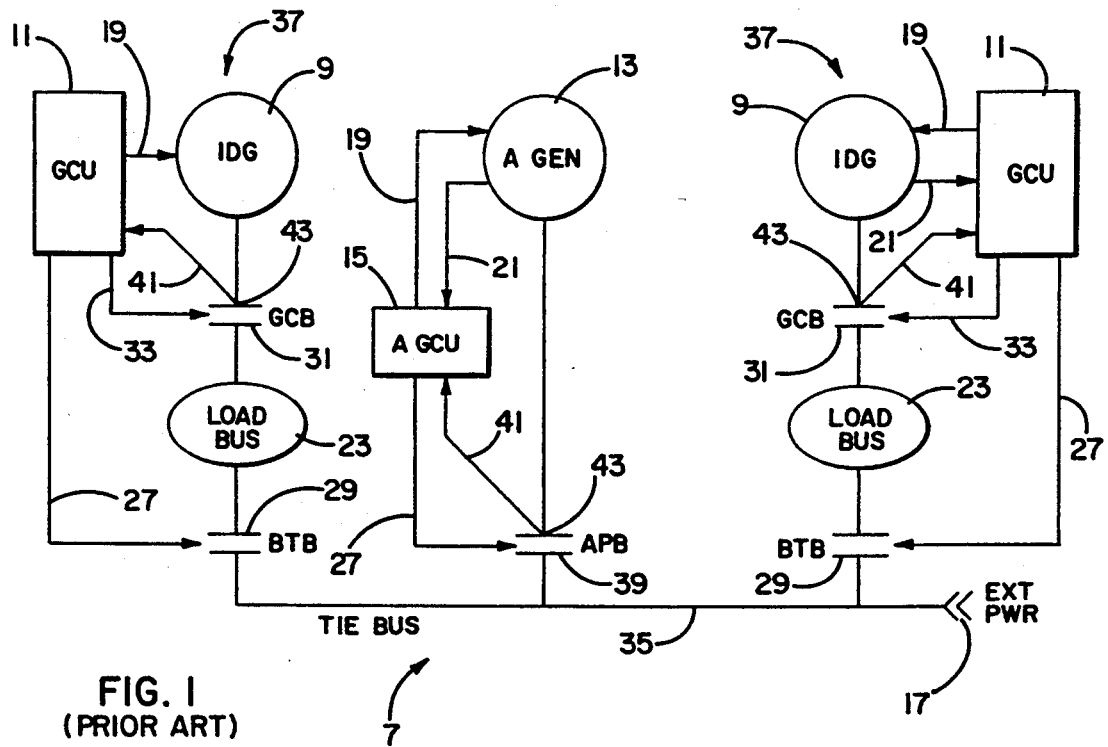
FIG. 1 illustrates a prior art single line diagram of a two channel aircraft electric power generating system of the type manufactured by the assignee of the instant invention.
Figure 2:
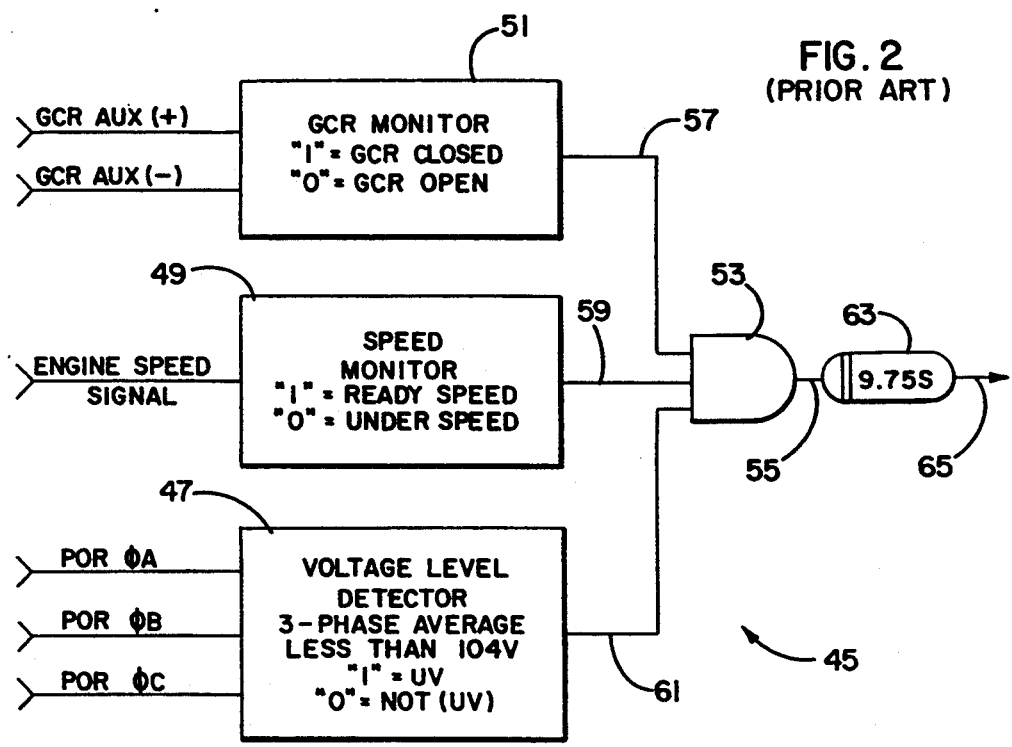
FIG. 2 illustrates a logic diagram of a prior art under voltage protection system.

The voltage level detection means 113 performs two functions and correspondingly generates two outputs. Firstly, the average root mean square voltage is calculated from the individual POR inputs on lines 41a, 41b, 41c and compared to a threshold to determine if an under voltage condition exists at the POR 43 (FIG. 1). If the average POR voltage is less than this threshold, approximately 104 volts for a 115 volt based EPGS, a logic level "1" is generated on line 117. A logic level "0" on line 117 indicates that the average POR voltage is above this threshold and thus no under voltage condition exists. The second function performed by the voltage level detection means 113 is a comparison of the root mean square voltage of each individual POR phase on lines 41a, 41b, 41c to a threshold to determine if an under voltage fault is the result of a failure of the wound exciter 81 or associated wiring 19a, 19b (see FIG. 3). If any of the POR voltages on lines 41a, 41b, 41c is greater than this threshold, approximately 50 volts for a 115 volt based EPGS, neither the wound exciter 81 nor associated wiring 19a, 19b (see FIG. 3) is failed and a logic level "1" is generated on line 115. If any of the POR voltages on lines 41a, 41b, 41c is less than this threshold, a failed wound exciter 81 or associated wiring 19a, 19b exists resulting in a de-energized IDG 9 and approximately zero volts output to the POR 43 (FIG. 1). For this situation a logic level "0" is generated on line 115.

A high phase detection means 109 is provided in the preferred embodiment of the instant invention which monitors each individual current sense signal on lines 21a, 21b, 21c and compares them to a threshold to discriminate between an under voltage condition resulting from a failure of the wound exciter 81 or associated wiring 19a, 19b (see FIG. 3) and that which is the result of a failure of the rectifier bridge 85 (FIG. 3). If each of the current sense signals is less than a threshold, corresponding to approximately 75 amps actual phase current for a 120,000 volt-ampere rated generator, than an under voltage condition is not the result of a failure of the rectifier bridge 85 (FIG. 3) and a logic level "1" is generated on line 111. If any of the current sense signals are greater than the threshold, an under voltage condition is not the result of a failure of the wound exciter 81 or associated wiring 19a, 19b (see FIG. 3) as these failures result in a de-energized IDG 9 capable of supplying approximately zero amps. For this situation a logic level "0" is generated on line 111.

Exciter field current detection means 97 monitors the exciter drive current sense signal on lines 95a, 95b and compares it to an acceptable operating range. If this signal is below the lower limit, corresponding to the amount of exciter drive current needed to excite a non-loaded generator, an open wound exciter 81 or associated wiring 19a, 19b (see FIG. 3) exists and a logic level "1" is generated on line 99. If this signal is above the upper limit, corresponding to the amount of exciter drive current needed to excite an overloaded generator supplying two per unit load, a shorted wound exciter 81 or associated wiring 19a, 19b (see FIG. 3) exists and a logic level "1" is generated on line 99. If this signal is within the acceptable operating range, a logic level "0" is generated on line 99 indicating no fault exists.

Further in accordance with the preferred embodiment of the instant invention, the first AND gate 53 produces an under voltage I protection signal, logic level "1" on line 55, in response to the under voltage control signal, logic level "1" on line 117, applied to the first input, and the ready-speed control signal, logic level "1" on line 59, applied to the second input, and the GCR closed status signal, logic level "1" on line 57, applied to the third input. Once the under voltage I protection signal on line 55 is generated, time delay 63 begins to operate. The duration of the time delay 63 is predetermined to coordinate with the trip characteristics of aircraft distribution protective devices (not shown), and is typically set to 9.75 seconds. A time delay duration of 9.75 seconds allows faults downstream of the distribution protection devices which overload the IDG 9 (FIG. 1) and result in an under voltage condition to be cleared by these devices prior to generating the under voltage I TD signal on line 65. If the undervoltage fault persists beyond the time by which the distribution protective device should have tripped to clear the fault, indicating a non-distribution type fault, the time delay 63 expires and the under voltage I TD signal on line 65 is generated.

The second AND gate 127 produces an under voltage II protection signal, logic level "1" on line 129, in response to the under voltage control signal, logic level "1" on line 117, applied to its first input, and the under voltage enable control signal, logic level "1" on line 111, applied to its fourth input, and the ready-speed control signal, logic level "1" on line 59, applied to its third input, and the under voltage II enable signal, logic level "1" on line 99 applied to its forth input, and not the under voltage II lockout signal, logic level "0" on line 115 applied to its fifth input (inverting input 139), and the GCR closed status signal, logic level "1" on line 57, applied to its sixth input. Once the under voltage II protection signal on line 129 is generated, time delay 131 begins to operate. The duration of the time delay 131 is predetermined to coordinate with voltage recovery response characteristics of IDG 9 (FIG. 3), and is typically set to 40 milliseconds. A time delay duration of 40 milliseconds allows transients which overload the IDG 9 (FIG. 3) and result in an under voltage condition to recover to steady state conditions prior to generating the under voltage II TD signal on line 133. If the under voltage fault persists beyond this period, time delay 131 expires and the under voltage II TD signal on line 133 is generated.

Further in accordance with the preferred embodiment of the instant invention, a third gate, as illustrated in FIG. 4 by OR gate 135, having first and second inputs and an output is provided. This OR gate 135 produces the protective trip signal on line 137 in response to the under voltage I TD signal, logic level "1" on line 65, applied to its first input, or the under voltage II TD signal, logic level "1" on line 133, applied to its second input. In response to this protection trip signal on line 137, the GCU 11 (FIG. 3) trips the GCR 101 and GCB 31 which de-energizes the IDG 9 and disconnects it from the load distribution bus 23. The GCU 11 then closes the BTB 29 to allow an alternate source of electrical energy to re-power the loads via the tie bus 35.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A protection system for an electric power generating system minimizing system exposure to, and power interruption resulting from, an under voltage condition, comprising:

means for sensing electrical current generated by a first generator unit, said generator current sensing means producing output generator current sense signals proportional to the magnitude of the generator current sensed thereby;

means for sensing an aircraft engine speed signal, said speed sensing means producing a generator input speed sense signal therefrom;

means for sensing generator exciter drive current, said exciter sensing means producing an output exciter drive current sense signal proportional to the magnitude of the exciter drive current sensed thereby;

means for sensing alternating current voltage generated by said first generator at a point of regulation, said voltage sensing means producing voltage sense signals proportional to the magnitude of the alternating current voltage sensed thereby; and a controller, responsive to said output generator current sense signals, said generator input speed sense signal, said voltage sense signals, and said output exciter drive current sense signal, for discriminating between an under voltage condition caused by an overload or a through fault on a main load distribution bus and an under voltage condition caused by a failure within said controller or associated wiring.

2. A protection system as recited in claim 1, further comprising:

a second breaker coupled to a load distribution bus, said second breaker closing
in response to a second close drive signal;

a tie bus coupled through said second breaker to said load distribution bus, said tie
bus connectable to at least one additional generator unit; and wherein said controller generates said second close drive signal upon isolating the under voltage condition, connecting said load distribution bus to said tie bus and allowing said additional generator unit to supply electric power to utilization equipment connected thereto.

3. A protection system for an electric power generating system minimizing system exposure to, and power interrupting resulting from, an under voltage condition, comprising:

means for sensing electrical current generated by a first generator unit, said
generator current sensing means producing output generator current sense
signals proportional to the magnitude of the generator current sensed thereby;

means for sensing an aircraft engine speed signal, said speed sensing means producing
a generator input speed sense signal therefrom;

means for sensing generator exciter drive current, said exciter sensing means producing an output exciter drive current sense signal proportional to the magnitude of the exciter drive current sensed thereby;

means for sensing alternating current voltage generated by said first generator at a point of regulation, said voltage sensing means producing voltage sense signals proportional to the magnitude of the alternating current voltage sensed thereby; and a controller, responsive to said output generator current sense signals, said generator input speed sense signal, said voltage sense signals, and said output exciter drive current sense signal, for discriminating between an under voltage condition caused by an overload or a through fault on a main load distribution bus and an under voltage condition caused by a failure within said controller or associated wiring; and wherein said controller comprises:

voltage level detection means, responsive to said voltage sense signals, for monitoring
peak voltage magnitude and for calculating an average voltage magnitude, said voltage level detection means generating an under voltage II lockout signal when said peak voltage magnitude of any phase exceeds a predetermined threshold, and an under voltage control signal when said average voltage magnitude drops below a predetermined threshold;

high phase detection means for generating an under voltage enable control signal when the magnitude of the highest of said output generator current sense signals is less than a predetermined threshold;

exciter field current detection means for generating an under voltage II enable signal when said output exciter drive current sense signal is outside a predetermined acceptable operating range;

generator input speed monitoring means for generating a ready-speed control signal when said generator input speed sense signal indicates that said generator input speed is above a predetermined minimum regulation speed;

logic means, responsive to said under voltage control signal, said under voltage enable control signal, said under voltage II enable signal, said under voltage II lockout signal, and said ready-speed control signal, for generating a protective trip signal; and breaker drive means for controlling the position of a first breaker, said breaker
drive means issuing a first trip drive signal in response to said protective trip signal, said first breaker tripping in response thereto, isolating said under voltage fault thereby.

4. A protection system as recited in claim 3, wherein said logic means comprises:

a first gate having first and second inputs and an output, said first gate producing an under voltage I protection signal on said output in response to said under voltage control signal applied to said first input, and said ready-speed control signal applied to said second input;

a first time delay coupled to the output of said first gate, said first time delay generating an under voltage I TD signal when said under voltage I protection signal is present beyond a predetermined time interval;

a second gate having first, second, third, fourth, and fifth inputs and an output, said second gate producing an under voltage II protection signal on said output in response to said under voltage control signal applied to said first input, and said under voltage enable control signal applied to said second input, and said ready-speed control signal applied to said third input, and said under voltage II enable signal applied to said fourth input, and not said under voltage II lockout signal applied to said fifth input;

a second time delay coupled to the output of said second gate, said second time delay generating an under voltage II TD signal when said under voltage II protection signal is present beyond a predetermined time interval; and a third gate having first and second inputs and an output, said third gate producing said protective trip signal in response to said under voltage I TD signal applied to said first input, or said under voltage II TD signal applied to said second input.

5. A protection system as recited in claim 3, further comprising a generator control relay electrically coupled in series with a voltage regulator means, said generator control relay responsive to said protective trip signal for isolating said voltage regulator means from said exciter input of said first generator unit, deenergizing said first generator unit thereby.

6. A protection system as recited in claim 5, wherein position status information of said generator control relay is communicated to said controller providing a lock-out of said protective trip signal when said position status information indicates that said generator control relay is in the open position.

* * * * *